Oct. 20, 1964 R. GUNN Re. 25,666

[LOCATING AND GUIDANCE SYSTEMS FOR VEHICLES FOR AIR, SEA AND LAND] AIRCRAFT LOCATING, GUIDANCE AND LANDING SYSTEMS

Original Filed Dec. 27, 1957 3 Sheets-Sheet 1

INVENTOR
ROSS GUNN

BY Fred E. Shoemaker

ATTORNEY

INVENTOR
ROSS GUNN

BY Fred E. Strolmaker

ATTORNEY

INVENTOR
ROSS GUNN

BY Fred. C. Shoemaker

ATTORNEY

United States Patent Office

Re. 25,666
Reissued Oct. 20, 1964

25,666

[LOCATING AND GUIDANCE SYSTEMS FOR VEHICLES FOR AIR, SEA AND LAND] *AIRCRAFT LOCATING, GUIDANCE AND LANDING SYSTEMS*

Ross Gunn, 4437 Lowell St., Washington, D.C.

Original No. 3,079,586, dated Feb. 26, 1963, Ser. No. 705,641, Dec. 27, 1957. Application for reissue June 26, 1963, Ser. No. 291,604
19 Claims. (Cl. 340—26)

Matter enclosed in heavy brackets [ ] appears in the original patent but forms no part of this reissue specification; matter printed in italics indicates the additions made by reissue.

This invention relates to methods of and means for generating, detecting and using electromagnetic signals for informing the operator of a vehicle of its position relative to a predetermined path.

In general the invention is directed to improvements in the well known electromagnetic guidance systems employing a current carrying conductor used to designate a predetermined path, and offers the means for defining and locating straight or curved paths, either horizontal or vertical or both, and designating the direction of deviation of the vehicle therefrom and indicating the approximate distance to the guide cable.

An important object of the invention resides in the provision of a predetermined path defined by a pattern of alternating magnetic flux arranged to influence detecting and measuring means on the moving vehicle so as to advise the operator the direction of and approximate distance to the path, and in the case of aircraft, the approximate, and under certain circumstances, the actual altitude.

Another important object of the invention comprises the arrangement of the signalling and receiving and advising apparatus whereby the width of the defined path decreases with reduction in altitude while the accuracy of the altitude reading simultaneously increases.

A further important object of the invention resides in the use of receiving and detecting apparatus which resolves the magnetic field surrounding a long guide conductor carrying alternating current into its vertical and horizontal components and separately detects these components to determine the vertical distance from and the horizontal distance and direction from the guide conductor.

As particular features of the invention may be mentioned the following:

Use in the vehicle carried detecting apparatus of means to compare the phase of the received signals with that of the current in the guide wire;

Provision on the vehicle of collector coils allotted one to the vertical and one to the horizontal component of the guide signal and means to measure the intensity of the received signal components;

Use of means to maintain the sensing or collector coils oriented in the horizontal and vertical planes in spite of the altitude of the vehicle so as to properly measure the signal components;

Use of radio signals at the frequency and phase of the guide conductor signals to provide for phase detection and for rectification of the signals at the vehicle;

The provision of an auxiliary signal along at least a portion of the main path and at a different frequency to designate positions thereon; and For use in landing helicopters the [added] feature of arranging a special pattern over an established landing area by means of an alternating current excitation of a distributed flat coil in said area so as to provide that vertical components of the A.C. field therefrom decrease steadily as the altitude increases permitting readings on instruments of the type already described to show the position of the helicopter relative to the vertical axis of said coil.

Other and further objects and features of the invention will be more apparent to those skilled in the art upon a consideration of the following specification and appended drawings wherein are disclosed several exemplary embodiments of the invention, with the understanding that such changes may be made therein as fall within the scope of the appended claims without departing from the spirit of the invention.

Figure 1:
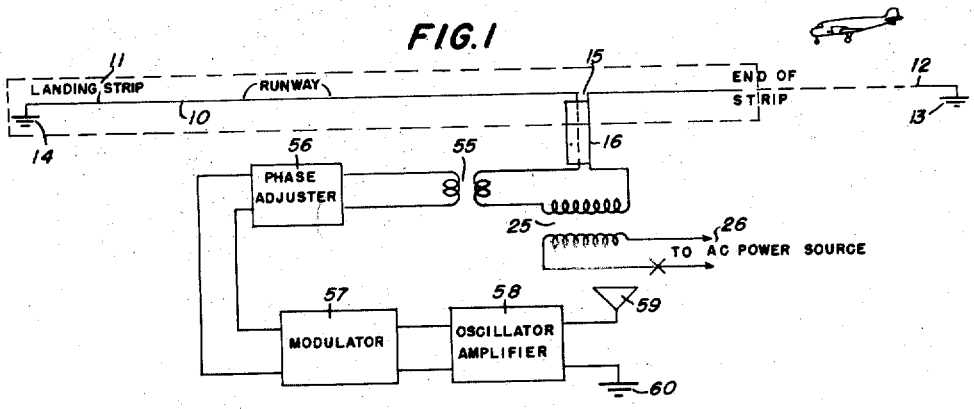
FIG. 1 is a schematic and diagrammatic view of the electromagnetic signal generating source, shown arranged on a landing strip for aeroplanes and equipped with a radio transmitter for sending signals in phase with those in the guide conductor for use with certain embodiments of the vehicle-carried receiving and indicating systems.

Many types of aircraft landing systems have been devised and many are in operation both for commercial and military purposes. In general the systems make use of guide paths designated by beamed radio signals or the use of radar at an airport for detecting the presence of the vehicle and use verbal radio signals to direct the pilot along the desired path. For their purposes these systems have proven reasonably satisfactory although not approved in all instances either by the airport facilities or the pilots required to use them. In any event the systems are extremely costly, require considerable apparatus both on the surface and on each aircraft, require several operators at all times and often fail to give the pilot a true and accurate picture of his exact lateral and vertical positions in respect to the runway surface.

The present invention while primarily designed for smaller than usual major city airports, where it is particularly applicable because of its low cost both for ground installations and those on the respective aircraft, but is equally applicable to installations of the largest type. The apparatus may also be used for vehicle guidance along roads, ships through mined sea channels and with slight modification to provide a nearly vertical and predetermined landing "slot" for helicopters descending to a restricted landing area in the vicinity of high buildings or other obstructions.

Although the teachings of this invention are applicable to many different problems on land, sea and in the air, the importance of guiding aircraft to safe landings in bad weather when the visibility is zero, the principal illustrative examples will be given for apparatus for this purpose although the modifications necessary for the several other purposes will be obvious. The word "vehicle" is intended, when used throughout the specification and claims, in its broadest sense to cover all forms of transportation not guided on rails.

In the case of aircraft landing and guidance, the predetermined path is defined by a selected pattern of changing magnetic flux that interacts with detecting and measuring means on the aircraft to show unambiguously the direction of the path from the instantaneous position of the craft, its approximate and many cases true horizontal distance, and the approximate altitude, which becomes the actual altitude whenever the aircraft is brought directly above the predetermined ground path.

The sensing apparatus defines the exact position of the predetermined path, and its sensitivity increases regularly as the craft approaches the excited guide conductor. Thus the landing slot established by the guide conductor is relatively wide at high altitudes but becomes progressively narrower as the touchdown point is approached, when the width of the defined path may be very small, i.e. a foot or so, so that the vehicle may be landed exactly in the middle of the runway. The accuracy of the altitude reading increases also as the altitude decreases so that at touchdown it may be read on the electromagnetic altimeter to a foot or so with great accuracy and reliability. The present system behaves in a fundamentally different manner than contemporary aircraft landing systems wherein the accuracy of the defined position is in general independent of the aircraft altitude or in some cases the accuracy becomes less as the touchdown point is approached.

The lines of magnetic force surrounding a long, single, electric conductor carrying current are circles lying in planes at right angles to the wire and having their centers at the wire. If the return current is at some distance, as for example deep in the earth, then the magnetic field intensity H at a distance R from the wire is given by $H=2I/R$ where I is the current in the wire expressed in abamperes and R is in centimeters. With the proviso that the magnetic field established below ground is of no importance in guiding the vehicle and may be ignored here, it is noticed that the horizontal component of the magnetic field has the same sign everywhere and is always at right angles to the current carrying guide conductor. At point Z centimeters above the guide conductor lying on the ground and X centimeters horizontally therefrom the horizontal component of the magnetic field $H_h$ is given by $$H_h=\frac{-2I}{Z\left(1+\left(\frac{X}{Z}\right)^2\right)}$$

Thus at constant altitude Z the horizontal magnetic field decreases slowly in the horizontal direction out to a distance equal to the altitude, at which point it is 50% of the value of the field over the conductor at the same altitude.

In a similar way the properties of the vertical component of the magnetic field which are unusually valuable in the present instance, are given by the expression $$H_v=\frac{2I}{Z\left(\frac{X}{Z}+\frac{Z}{X}\right)}$$

This expression shows that at constant altitude Z the vertical component is small at considerable lateral distances from the guide conductor, but as the conductor is approached the field increases slowly to a maximum at a distance $X=Z$ but at this point it starts to decrease and immediately over the wire it approaches zero, reverses sign, climbs to a negative maximum at $Z=-X$ and then drops off toward zero. This property of the vertical component is used to define the lateral position of a moving vehicle in relation to the position of the current carrying guide conductor.

The above expressions and the description of their use apply to a magnetic field established by constant current in the wire, but a guiding system using the field of a steady current is not very useful because the steady magnetic fields of the earth cannot easily be separated therefrom and it has been found expedient to use alternating or varying currents to produce alternating or varying magnetic fields which may be readily measured and separated from the earth's steady field. The system may function with alternating current if sensing or induction coils are used to generate small voltages that may be amplified when necessary, and if these voltages are rectified in such a way as to define their sign, or phase with respect to a "reference voltage" having exactly the same frequency and a fixed phase relation to the exciting current producing the original changing magnetic field.

What is necessary is a "phase responsive rectifier" so that the rectified current reverses direction when the phase of the voltage supplied thereto reverses 180 degrees. Such a rectifier has different characteristics than the common diode type and may comprise a so-called "locked in" amplifier or other properly synchronized types so that the sign or phase of the induced alternating current voltage becomes immediately evident on a direct current meter and because such rectifier produces a direct current voltage proportional to the first power of the applied alternating current voltage instead of the second power as is common with a diode or other similar type of rectifier.

For an understanding of the system consider a long conductor laid down the middle of an aircraft landing strip and extending a number of miles downwind in the direction of approach for landing aircraft. Each end of the conductor is well grounded and at some convenient point it is interrupted and supplied with alternating current, or varying current, from a suitable power source which will flow through the length of the conductor and thereby establish a predetermined pattern of changing magnetic flux extending throughout the landing area and a few miles downwind where an approaching aircraft may use this pattern to orient itself into a favorable position for landing.

In order to reduce extraneous magnetic fields, outside the predetermined guide path, to a minimum, a coaxial conductor is used to feed the guide cable and it is assumed that the return currents are widely distributed through the ground or that a return circuit is provided at a considerable depth. In the event that poor conductivity exists the return currents may be well distributed over a considerable area by a series of parallel conductors. The magnetic pattern established may be tailored to fit the specific requirements. For example, when the guidance system is used to steer a vehicle through a mine field it would not be necessary to disburse the return circuit as suggested above but only to divert the return conductor where it could not mislead the guide vehicle. The purpose of diversifying the return in the aircraft landing case is to make certain that the pilot cannot inadvertently pick up a return conductor and follow it into a rough or unsuitable landing area.

Any reasonable frequency of alternating current may be used for energizing the conductor as long as it may be maintained essentially in phase throughout the conductor length or that changing phase may be compensated in the receiver used to sense the pattern. Such compensation is not always easily achieved and present equipments normally use power frequencies of from 50 to 5000 cycles, which not only show negligible phase change in a conductor 10 miles long but are readily available from convenient power sources, although it is desirable to use a frequency different from local power sources to minimize the influence of strays or interfering magnetic fields.

To take advantage of the suitable electromagnetic field established by the guide conductor induction type coils are used on the vehicle to sense the changing magnetic field of the guide conductor current and are arranged to respond separately to the transverse, vertical and the horizontal magnetic field components. Where extreme precision control is unnecessary, a flat coil of many turns, lying in the mean horizontal plane established by the vehicle serves to sense the vertical components. Such a coil could also have a magnetic core oriented to be vertical on the average. In a similar way the coil sensing the transverse horizontal component of the magnetic field might be a flat coil mounted in a vertical plane parallel to the fore and aft axis of the vehicle. One coil each may fulfill the ordinary requirements but experiment has shown that sometimes a single coil produces guidance signals which are too sharply defined and a multiplicity of sensing coils appropriately spaced on the vehicle may be used to broaden the response.

It is desirable to maintain the sensing coils substantially in their true horizontal and vertical positions by the use of gimbals or gyroscopic stabilizers.

Because the voltages induced in the sensing coils are usually small when the vehicle is at some distance from the guiding conductor amplification may be resorted to and the output from each amplifier fed into phase responsive rectifying or detecting circuits to provide a signal voltage. For convenience this signal voltage is direct current and the circuits are designed so that a 180 degree reversal in phase of the signal picked up by the sensing coil reverses the direction of the signal output and can be sensed by an indicating meter so arranged as to have the needle point out the direction of departure from the predetermined path.

Reference should now be had to FIG. 1 of the drawing for an understanding of the ground installation for a simple form of the invention. Here the guide conductor 10 is normally laid down the center of the landing strip 11 and may extend downwind 12 from it for several thousand feet or more, as shown, to a ground 13 at the far end. At the landing strip end a ground is shown at 14. Somewhere convenient in its length the guide conductor is interrupted at point 15 and fed through a pair of wires having a small external magnetic field such as the coaxial cable 16, by a transformer 25 or directly from the energizing current source 26 shown as connected to the primary of the transformer. It is essential that the energy supplied to the conductor 10 be of fixed alternating current amplitude and preferaby a fixed frequency, although with appropriate measures such is not essential.

Figure 2:
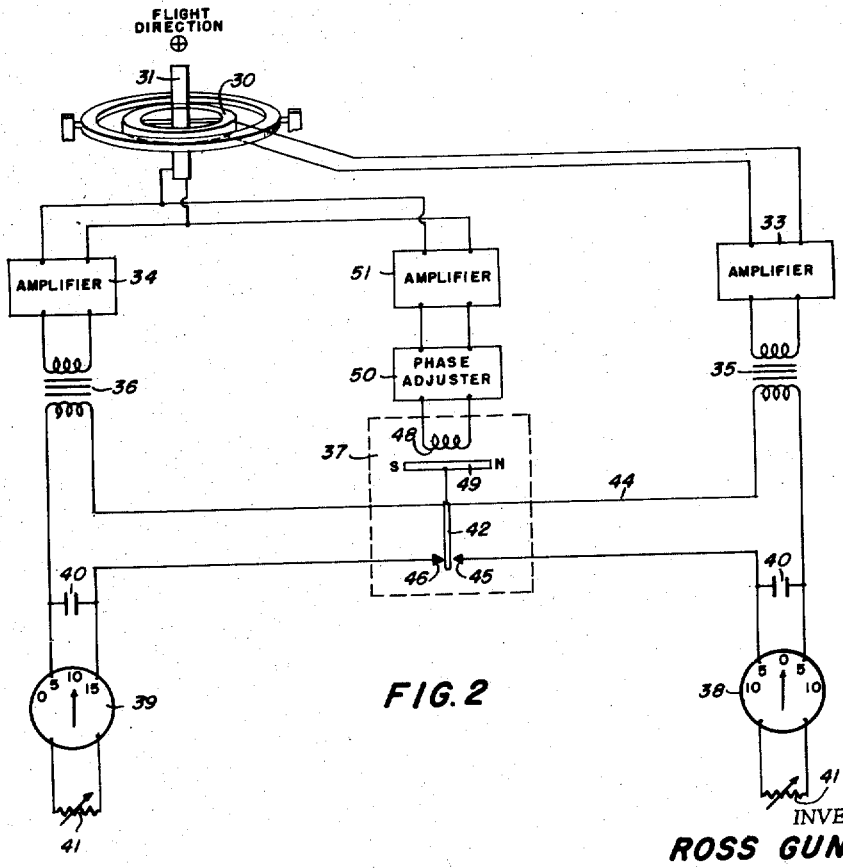
FIG. 2 is a diagrammatic view of a simplified form of vehicle-carried signal sensing apparatus using the received electromagnetic signal for operation of synchronous signal rectifying means.

FIG. 2 shows a simple arrangement of airborne equipment for cooperation with an excited guide conductor 10. In FIG. 2 two independent perpendicularly arranged sensing or pick-up coils are oriented to lie, one, numbered 30, in the horizontal plane to be responsive to the vertical component of the varying magnetic field established by the current in the guide conductor, while the second, numbered 31, is responsive to the horizontal component of the field as given by the respective equations earlier in this specification.

Under adverse conditions these coils should be maintained substantially in their original horizontal and vertical orientations by the use of gimbals as shown or by gyroscopic control, so that even though the vehicle tips through a large angle they will remain essentially in their respective horizontal and fore and aft vertical planes.

Since the voltages induced in coils 30 and 31 are small they are usually amplified in any well known manner. As shown in the drawings, coil 30 is connected by appropriate conductors to amplifier 33, while coil 31 is connected by a suitable pair to amplifier 34 of any desired type. The output of each amplifier is connected through an appropriate transformer 35, 36 respectively to a center zero direct current meter 38 and a conventional scaled direct current meter 39, each shunted by an appropriate condenser 40 and sensitivity adjuster 41. Amplifier 34, or as shown a parallel connected amplifier 51, is connected via phase adjuster 50 to a vibrating type rectifier 37.

The rectifier 37 is shown as including a vibrating reed 42 connected in the common conductor 44 between the secondaries of transformers 35 and 36 and oscillatable between the stationary contacts 45 and 46 connected respectively to the meters 38 and 39 to which the other conductor from each transformer is also connected as shown.

The reed 42 which acts in conjunction with the contacts 45 and 46 as a rectifier for the output from amplifiers 33 and 34 in order that direct current meters may be used is vibrated by a polarized relay including the coil 48 energized from phase adjustor 50 and the permanent magnet 49. It will be remembered that the energy passing through coil 31 never reverses phase and is always synchronized with the conductor 10 and is thereby suitable for operating the synchronous rectifier, making use of phase adjustor 50 from the output of amplifier 51 in order to compensate for such dephasing as may occur in the amplifier.

Thus whenever an adequate alternating current is induced in coil 31 by the current in the guide conductor the relay 37 operates to open and close the contacts in strict synchronism with the alternating current flow in the guide conductor and by adjusting the circuit components of the phase adjuster the amplified alternating voltages may be rectified and will deflect the meters 38 and 39 by an amount proportional to the voltages induced in coils 30 and 31 and the direction of meter deflection depends on the phase of the induced voltage. These meters will respond to induced voltages only of the same frequency as that operating the polarized relay and other frequencies cancel out when averaged over a time comparable to the response time of the meter.

The phase of the voltage induced in coil 31 does not reverse, unless the coil is reversed, so that relative to the guide conductor the phase of the operating cycle of the relay is maintained essentially constant. Accordingly, when the phase of the voltage induced in coil 30 is reversed contacts 45 and 46 continue to open and close as before and the reversal of phase in coil 30 reverses the direction of current flow through meter 38 by 180 degrees. Thus as the vehicle moves from one side of the guide conductor to the other the vertical component of the inducing magnetic field changes sign and this is manifest by a deflection of meter 38 from one side of its mid-zero point to the other. The meter may be so connected that the pointer will always point toward the bearing of the guide conductor no matter what position the vehicle may assume, provided only that it proceeds in the same direction along the guide conductor. Thus it is evident that the elementary system of FIGS. 1 and 2 is capable of directing a pilot along a path more or less coincident with the guide conductor.

Further information is displayed to the operator by the voltage measured from coil 31. Assuming that the pilot has maneuvered the craft so that it is moving directly over the guide conductor so that the lateral displacement $X=0$. In this case the magnetic field is entirely horizontal and its intensity is given by $$H_h=\frac{2I}{R} \text{ or } R=\frac{2I}{H_h}$$

Therefore, if the sensing coil is calibrated, the amplification and current in the guide conductor known, and the characteristics of the transformers and meters are standardized, the reading of meter 39 may be directly calibrated in altitude above the guide conductor. Low current readings correspond to high altitudes and high current ones to low altitudes so the pilot knows exactly how far he is above the ground. This is extremely important during the critical let-down period for as the sensing coils approach the guide conductor the induced voltages rise (inversely as the first power of the distance) and the accuracy of measurement steadily increases. This is a very valuable feature of the system. If the operator is careless in lining up the vehicle with respect to the guide conductor, the altitude reading may be too high, and thus it is essential that all the information provided by both the horizontal and vertical sensing coils be continually employed.

The apparatus of FIGS. 1 and 2 are illustrative and it is entirely practical to combine some of the functions that have been outlined into a single unit. For example, the amplifiers 34 and 51 may be combined. The system outlined for FIGS. 1 and 2 operates well but has the disadvantage of requiring a moderately large signal in coil 31 before the polarized relay 37 begins to function and thus an aircraft searching a region for the guide cable and a usable signal might easily miss the magnetic pattern. It is, therefore, desirable to have other methods of practicing the invention which provide greater sensitivity.

Figure 3:
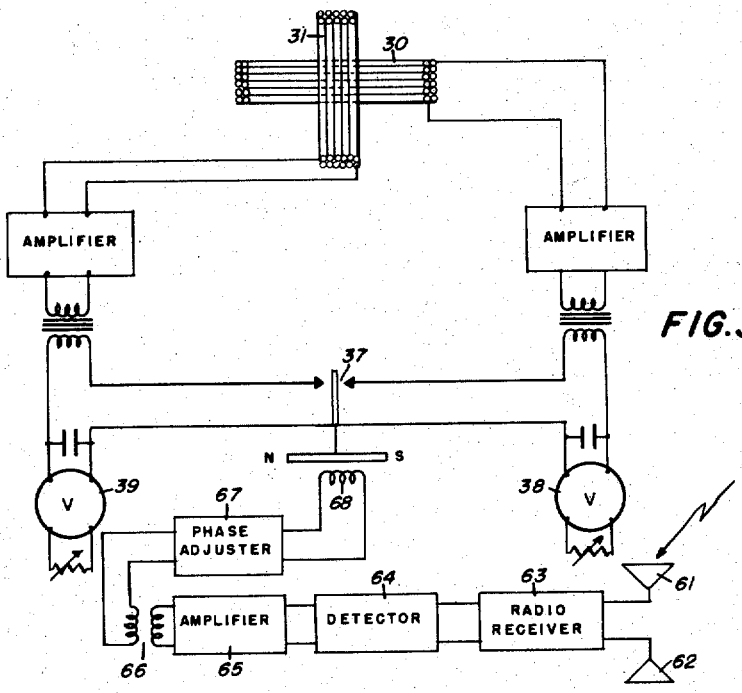
FIG. 3 is a diagrammatic view of a signal sensing apparatus using radio control derived from the arrangement shown in FIG. 1 to synchronize the signal rectifying means.

One such method combines the apparatus of FIGS. 1 and 3. In FIG. 1 the power source also energizes transformer 55, the secondary of which is connected to phase adjuster 56 whose output by way of 57 modulates the oscillator-amplifier 58 of a radio transmitter having antenna and grounds respectively, 59 and 60, whereby a signal output of the frequency on wire 10 is superimposed on the carrier and may be received by antenna 61 and counterpoise 62 connected to receiver 63 on the aircraft, the output of which is detected at 64, amplified at 65 and fed by a transformer 66 and phase adjuster 67 to coil 68 actuating synchronous rectifier 37 which is otherwise identical with the one defined in FIG. 2. The remaining apparatus shown in FIG. 3 is identical with that in FIG. 2, the coils 30 and 31 being shown in greater detail and each being connected only to its own amplifier.

The operation of the circuit of FIG. 3 with the added features of FIG. 1 is clear from the operation of FIG. 2, the only difference being that a much stronger synchronizing signal at greater distances may be received by radio transmission for synchronizing and operating the rectifier. The phase adjuster must be carefully manipulated, in the original setting of the apparatus, to insure synchronism. The apparatus just described provides a reference frequency on the aircraft which is exactly the same as that used to excite the guide conductor and bearing a fixed phase relation to it so that the rectifier contacts open and close in synchronism with the exciting current in the cable and thus relatively weak alternating voltages induced in coils 30 and 31 may be rectified and the phase or rather direction of the rectified voltage as well as its magnitude read on the meters 38 and 39. Thus the guide conductor is much easier to find and its influence can be detected at notably higher altitudes under constant conditions of excitation.

The polarized relay as a rectifier is subject to certain ills, and circuits without moving contacts are frequently desired. For example, the so-called "locked-in amplifier" accomplishes the same result and the output from such circuits will operate direct current meters giving readings that are proportional to the alternating voltages applied and reverse the reading of the direct current meter connected to coil 30 when phase reversal occurs. Other specialized circuits for accomplishing the same objective may be found in the electronic literature.

Figure 4:
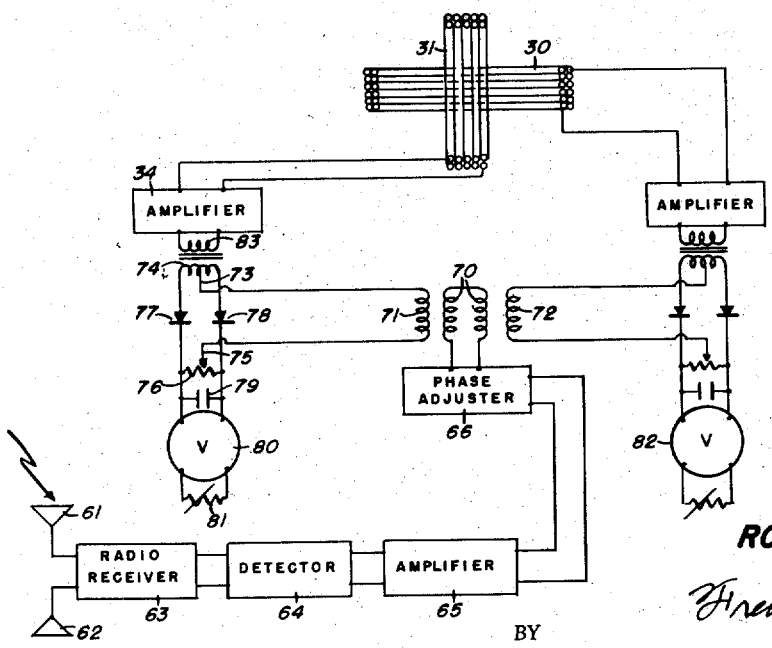
FIG. 4 is a view similar to FIG. 3 showing apparatus for eliminating the contact type rectifier for more reliable operation.

FIG. 4 illustrates a usable circuit employing a locked-in amplifier and a modulated reference signal transferred to the vehicle by radio as in connection with FIG. 3. The arrangements on the ground are essentially those illustrated in FIG. 1.

The radio carrier is selected and amplified by apparatus as shown in FIG. 3 and the phase adjusted at 66. The output of this apparatus is fed to two primaries 70 or conversely to a single primary of a transformer having secondaries 71 and 72 which introduce the reference signal voltage into two or even three locked-in balancing networks. A description of one of these identical networks will be adequate for the purpose of this description. Thus the network to the left is energized from coil 31 and synchronized by signals from secondary 71. One conductor from this secondary is connected to center tap 73 of split secondary 74 and the other conductor to slider 75 on balancing potentiometer 76. Conductors connecting secondary 74 to potentiometer 76 contain low voltage rectifiers 77 and 78 poled as shown, and the network is shunted by condenser 79, meter 80 and variable sensitivity control 81. The meter on the other side is numbered 82 and is connected in an identical circuit fed by secondary 72 and coil 30. This circuit performs the same functions as that of FIG. 3 except that the polarized relay and its arcing contacts are eliminated, although some of the advantage is offset by a loss in sensitivity of the sensing circuits.

Figure 5:
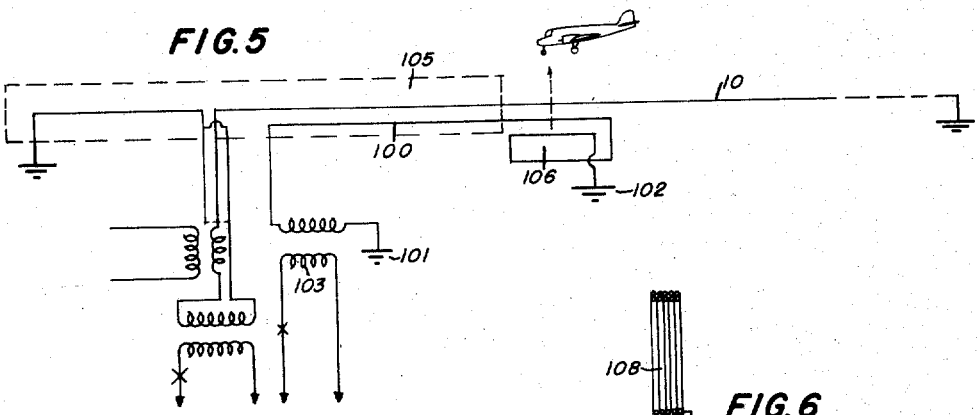
FIG. 5 is a view similar to FIG. 1 and illustrating the use of an auxiliary electromagnetic signal for distance designation along the guide path.

FIG. 5 illustrates an added feature to give the pilot one further important bit of information, i.e. the exact instant that his aircraft passes the boundary of the field or the beginning of the landing strip, and may also advise him for instance that there is still, say, a thousand feet more of runway ahead of him after he has traversed portion of it. This need is met by the installation of an auxiliary guide conductor 100 supplemental to the one numbered 10 which is identical with and energized in the same manner as the one shown in FIG. 1. The second conductor is parallel to a portion of the first and closely adjacent thereto. Each end of this conductor is grounded at 101 and 102 or treated in the same manner as the main conductor if the ground conductivity requires it. Although not so shown the feed from transformer 103 may also be through a coaxial cable for reasons already pointed out. At the beginning of the runway 105 conductor 100 is coiled into a marker beacon induction coil 106 having a horizontal longitudinal axis and this coil, plus the wire 100, is energized by alternating current power at a frequency different from that as supplied to the main guide conductor and preferably also some frequency between 400 and 4000 cycles. In general, this auxiliary conductor is not installed for the full length of the landing strip and is so arranged that the disappearance of its signal on the aircraft warns the pilot that he has only 1000 feet, say, of landing strip left. The coil 106 is mounted just outside the touchdown point of the landing strip to produce a limited response zone about as wide as the width of the landing strip and if the pilot does not sense its presence as he passes over his estimated position of the touchdown point, he can make a second circuit to look for it. The auxiliary circuit interferes in nowise with the operation of the main guide conductor as long as it operates on a different frequency, which latter feature permits the main conductor to be used to carry both currents by the simple expedient of installing suitable filter circuits.

Figure 6:
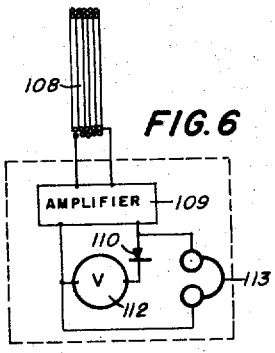
FIG. 6 is a schematic view of an auxiliary receiving device for use with the signal of FIG. 5.

For cooperating with the auxiliary induction system disclosed in FIG. 5 the aircraft carries the simple apparatus illustrated in FIG. 6, comprising a sensing or induction coil 108 responsive to the horizontal component of the fluctuating field and which is oriented with its axis transversely at right angles to the line of flight. The voltages induced in this coil are amplified by amplifier 109 and rectified by either a phase sensitive or diode rectifier 110 and used then to actuate the direct current volt meter 112, or alternatively the alternating current output from the amplifier can be connected directly to telephone receivers 113 providing the pilot with an aural signal for the final stages of the landing routine. Coil 106 in conductor 100 is designed to provide large fields only near the desired flight path over the end of the runway or touchdown point so that the pilot will see or hear a signal from the coil only when he is lined up with the end of the runway, and this signal, at lesser intensity from conductor 100, will continue with him all the way down the landing strip until a point approximately 1000 feet from the far end of the runway. At this cutoff point the auxiliary conductor is preferably terminated so no further auxiliary signal will be picked up by the pilot.

It may be noted that many pilots prefer only the excited marker coil 106, while others prefer the auxiliary continuing signal provided by conductor 100. Still other pilots with a fine sense of elapsed time from the instant they have passed the intermediate radio marker beacon a few miles out have no use for either, and feel that they know well enough where the touchdown point should be. Thus any part of the auxiliary equipment of FIGS. 5 and 6 may be employed.

Figure 7:
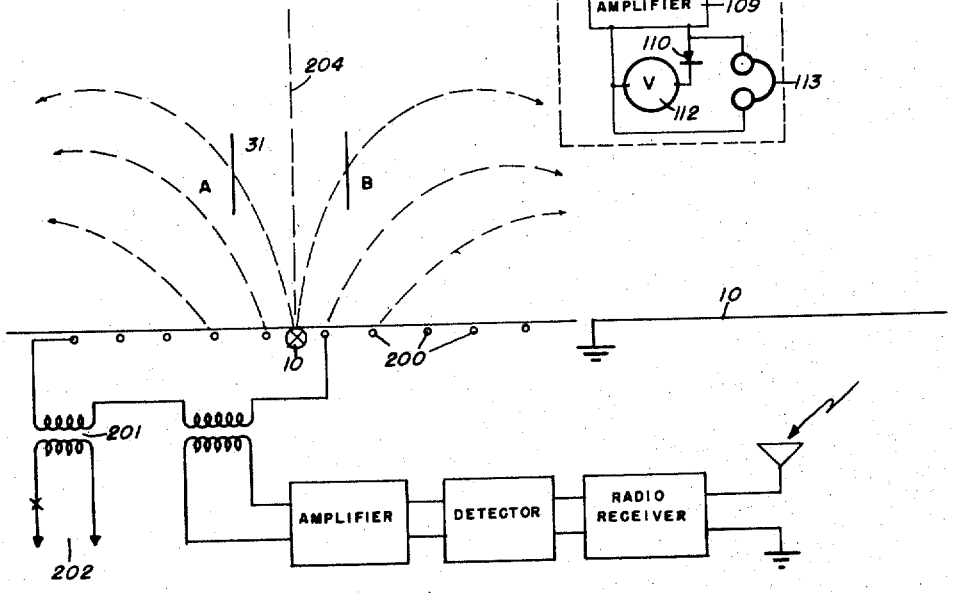
FIG. 7 is a diagrammatic view of a system supplemental to that of FIG. 1 for supplying a vertical guide path for helicopter landing.

While helicopter landings in restricted areas with poor visibility are always difficult, the principles outlined above are directly applicable but it is preferred, for instance in urban areas, that the craft maintain an altitude of 500 feet or more to make certain of clearing all obstacles as it approaches a relatively restricted landing area, and for this purpose the guide conductor 10 of FIG. 1 may be used. *However, the pilot may reach a position above the landing area by any known means such as radio instructions, intersecting guide beams, etc.* The apparatus carried by the craft will be the same as in FIG. 2 whereby direction and elevation are given. However, to land in heavy fog in the midst of high obstructions requires a specialized pattern of magnetic fields established immediately over the desired landing area, such as by the flat coil 200, illustrated in FIG. 7, substantially at the surface of the ground and distributed over the major portion of the landing area. It is excited by transformer 201 from a power source 202, but in order that it have a particularly desirable magnetic field distribution special care is required.

A simple coil surrounding the landing area would have a nearly constant field near its center and its magnitude would change inappreciably as the altitude of the sensing coil is increased and hence could not be used to provide altitude indications. The specific form of coil 200 is not important, but it is essential that the vertical component of an alternating current field decreases steadily as the altitude increases, otherwise altitude could not be determined unambiguously. A coil of the pan-cake type, such as illustrated at 200, will establish a flux pattern like that suggested by the lines in FIG. 7 if the exact distribution of the current sheets in the coil are carefully determined.

The vertical, *or polar,* axis 204 through the center of the coil defines the region where the magnetic flux is vertical and has no horizontal component, but at every place off this axis the field has a horizontal component and its magnitude, at a given altitude, will increase regularly as one moves away from the axis until at a considerable distance therefrom it begins to decrease. Thus a helicopter, with a sensing system like that shown in FIG. 4, hovering in a region above the coil 200 will provide on the meters readings that will show the position of the helicopter relative to the vertical axis 204 and the landing surface in which the coil is embedded.

The coil 31 in FIG. 4 is so mounted on the helicopter that it is responsive to the horizontal component of the magnetic field at right angles to the normal flight axis, and while in this position no deflection of the meter 80 will occur when the helicopter is on the vertical axis 204 or when the normal flight axis is headed toward the vertical axis, and the pilot may maneuver himself to the axis by judicious changes of the craft's heading and by watching the effect on meter 80.

[A] *As* a further help a third sensing induction coil could be mounted to respond to the horizontal component of the field which is at right angles to the first, i.e. sensitive to the longitudinal-horizontal component, and the response of the two output meters would then define unambiguously the position relative to the vertical axis. If the helicopter heads in some fixed direction and brings the sensing coil 31 to the position A in FIG. 7, the horizontal component of the flux will enter the coil from the right and the meter 80 will deflect one way, but if the craft moves to position B while maintaining this orientation, the horizontal component of flux will enter the coil in the opposite direction and the meter will read in the opposite sense. This same arrangement may also be useful on an aeroplane and is particularly useful when a flight course parallel to the guide conductor is desired and when it is not important to orient the plane immediately above the guide conductor. Under certain landing conditions such additional information might be extremely valuable.

If the plane of the third sensing coil contains axis 204 its meter will read no current, but if the craft is headed toward the center the meter will read one way and if headed away from the center will read the other way. Thus by watching the meter a pilot may, after developing some skill, steer his machine along the axis 204 to a safe landing.

As previously mentioned the distributed winding of coil 200 is designed to produce a magnetic field near the center of the coil or landing area that increases steadily as the coil is approached from above so that sensing coil 30 will produce a steadily increasing voltage as the landing surface is approached and if the landing is made nearly along the axis 204 the meter 82 may be calibrated directly in feet above the landing surface and thus serves as an electromagnetic altimeter whose accuracy increases as the touchdown point is approached.

From the above teaching it is clear that applicant's invention may be applied to the problem of the safe landing of helicopters in low visibility and areas of high obstructions. It will be noted that the coil 31 provides altitude information when the exciting current flows in a long wire such as 10, but coil 30 provides the altitude information when a flat coil lying on the ground, as 200, is employed and switching arrangements to reconnect the sensing coils or to connect the differently oriented horizontal coils may be necessary when horizontal guidance is replaced by a vertical guidance pattern. The auxiliary circuits outlined in FIGS. 5 and 6 are not necessary when landing a helicopter if the pilot is not likely to run out of suitable landing platform.

Obviously the teachings of the several inventions above permit the use of the signals which normally operate the display meters to be introduced into known electronic computers whose output may be used to control the steering surfaces of ships or aircraft through the use of suitable couplers or auto-pilots. These techniques are too well known to the aviation industry to need description here, but it is obvious that with their use fully automatic landings can be accomplished. Obviously the apparatus may be arranged to be over-ridden by the pilot when manual control is desired.

Having thus described my invention, what I claim as novel and desire to secure by Letters Patent of the United States is:

1. In a guidance system for vehicles, in combination, a [concentrated] *linearly disposed* guide conductor means positioned adjacent the surface over which the vehicle travels during at least a portion of its guided course, means energizing said conductor with alternating current in the audio frequency range with substantially negligible phase change throughout conductor length, means completing the conductor circuit over a laterally dispersed area, induction means on said vehicle for sensing the voltage resulting from the vertical components of the conductor flux at the vehicle position, means on said vehicle to rectify said voltage in synchronism with the conductor energization, means to indicate the polarity of the rectified voltage in respect to the phase of the current in said conductor of the rectified voltage in respect to that in said conductor and means to indicate the magnitude of said rectified voltage, whereby the direction of lateral deviation from the vertical plane through the conductor and the approximate distance thereof may be ascertained.

2. The system of claim 1 in which said synchronous rectification is effected by a "locked-in" amplifier.

3. The system of claim 1 in which said rectification is effected by a contact rectifier and means sensitive to horizontal components of said conductor flux controlling the synchronization of said rectifier.

4. The system of claim 1 in which said rectification is controlled by a radio signal received on said vehicle, a transmitter for said radio signal and means to modulate said signal synchronously from said guide conductor energization.

5. The system of claim 1 provided additionally with induction means on said vehicle for sensing the voltage resulting from the transverse horizontal components of the conductor flux at the vehicle position; means on the vehicle to rectify said last mentioned voltage in synchronism with the conductor energization; and means to indicate the magnitude of said last mentioned rectified voltage as representative of altitude above said conductor.

6. In a landing and guidance system for aircraft, in combination; means for establishing a predetermined pattern and uniform average level of changing magnetic flux distributed along a concentrated and longitudinally extended guide path of substantially negligible phase change throughout the path and *including a linearly disposed guide conductor* substantially at the surface of the earth; means on an aircraft for measuring the horizontal and vertical components of the flux separately; and means separately responsive to the outputs of said means on the aircraft in accordance with the phase of one in respect to said changing magnetic flux to indicate direction of deviation from the line of said path and in accordance with the amplitude of both outputs to indicate altitude and degree of deviation.

7. The system as defined in claim 6 in which a second predetermined pattern of magnetic flux, changing at a different frequency, is distributed along such portion of the established path as to indicate a predetermined portion thereof, and means on said aircraft to separately detect the presence of the second flux.

8. The system of claim 7 in which said second pattern includes a narrow linear source path adjacent a portion of the first path and a laterally disposed path at the entrance end of the said guide path.

9. In an aircraft guidance system, in combination; a [long concentrated] *linearly disposed guide* conductor near the ground surface; laterally distributed means completing a circuit with said conductor and a source of sonic frequency alternating current of uniform average intensity and of substantially negligible phase change throughout the length of the conductor; [air] *an* aircraft having an induction coil thereon responsive to the vertical components of the magnetic flux pattern established by said current; means to measure the amplitude of the voltage induced in said coil, means to synchronously rectify said induced voltage and means to indicate the phase polarity thereof in respect to the said conductor current and apparatus for converting said measurements for aircraft navigation.

10. In an aircraft landing system, in combination, a [concentrated longitudinally] *linearly disposed* extended guide conductor at the ground surface, distributed conductor returns for said conductor; means energizing said conductor with an alternating current of sonic frequency and fixed average value; coil means on the aircraft responsive to the horizontal components of the magnetic flux produced by said current; means to measure the intensity of the induced voltage and means responsive to said measurement to designate the altitude of the aircraft immediately above said guide conductor.

11. In an aircraft guidance system, in combination, a [concentrated long] *linearly disposed guide* conductor near the ground surface; distributed means completing a circuit with said conductor and a source of sonic frequency alternating current of uniform average intensity and with substantially negligible phase change throughout conductor length; an aircraft having induction coils thereon responsive respectively to the vertical and horizontal components of the magnetic flux pattern established by the said current; means to measure the amplitude of the induced voltage and the phase relationship thereof in one coil in respect to said conductor current phase and display the values thereof; means to measure the intensity of the induced voltage in the other coil and to display the values thereof and when the amplitude of the first voltage is zero to indicate the altitude of the aircraft.

12. The system of claim 11 in which the said induction coils are mounted for limited fore and aft and lateral tilting movements in respect to the aircraft, and means to maintain said coils respectively horizontal and vertical in spite of aircraft tilt or pitch.

13. The system of claim 11 in which each of the induced voltages is amplified and rectified, and means to automatically indicate the polarity of at least one of the amplified and rectified voltages with respect to the phase of the voltage in said long conductor.

14. In a helicopter guidance and landing system, the combination with the system of claim 11 of means adjacent the terminal end of said long conductor for establishing an alternating magnetic field, wherein the vertical components decrease steadily in intensity as the altitude increases and radiating horizontal components are present except on the polar axis of said field, which horizontal components increase in magnitude at any given altitude as the distance from said axis increases, said induction coils and associated elements being responsive to said field components to guide the operator toward said axis.

15. The system of claim 14 in which the helicopter is provided with a third induction coil oriented to be responsive to horizontal components of the field at right angles to those to which the first such coil is responsive, and associated elements for said third coil to display amplitude and phase of the induced voltage therein.

16. The combination [with] *of* a [concentrated] *linearly disposed* guide conductor adjacent the ground surface excited by constant amplitude alternating current, [and a] disbursed return conductor *means* [of] *and* airborne induction coils oriented to sense vertical and horizontal components of the magnetic field from said guide conductor and convert them to alternating current voltages; rectifying means and a direct current meter connected to each coil; means receiving signals from said conductor exciting source to phase and synchronize the rectifying means with said alternating current in the conductor which has negligible phase change throughout the length of the conductor; said meters being graduated to show the altitude of the induction coils and the direction and lateral departure thereof from the course defined by the guide conductor.

17. In a guidance system for aircraft, in combination, means for establishing a predetermined pattern and uniform average level of changing magnetic flux distributed along a [concentrated and longitudinally extended] *linearly disposed* guide [path] *conductor* substantially at the surface of the earth and of negligible phase change throughout the length of said path, means to establish a radio signal modulated synchronously with the flux change along said path, a coil on an aircraft adapted to fly adjacent said path, said coil being responsive to said magnetic pattern and serving to convert said changing flux to an alternating current, means interlocking the electrical output from said coil and said radio signal to synchronously rectify said output and a direct current meter responsive to said rectified output arranged to indicate the relationship of the aircraft to said path.

*18. In a helicopter landing system, in combination, a conductor arranged substantially in the form of a flat pancake coil substantially at the level of and covering most of the restricted area of a helicopter landing field, means energizing said conductor at a substantially sonic frequency, the turns of the conductor being so disposed and distributed over said restricted area as to establish an alternating magnetic flux field relatively uniformly dispersed about a polar axis extending upwardly through said coil wherein the field components parallel to said axis decrease in intensity as the altitude increases and radiating components perpendicular to said axis are present at least throughout said restricted area except on the polar axis and increase in magnitude to a maximum at any given*

*altitude as the perpendicular distance from said axis increases; a helicopter having first and second induction coils thereon responsive respectively to the magnetic flux field components parallel to and perpendicular to said polar axis; means to measure the amplitude of the voltage induced in the first coil responsive to the parallel components and display the values thereof as an indication of height above the landing field when the craft is substantially on the polar axis; means to measure the amplitude and phase of the voltage induced in the second coil responsive to the components perpendicular to said polar axis and display the values and direction thereof, whereby the craft may be advanced to the polar axis at any desired altitude and thereby guided to a landing.*

*19. The helicopter landing system as defined in claim 18 in which a third induction coil is provided on the helicopter positioned with its axis of principal response at right angles to the axis of principal response of said second coil, said second and third coils being independently responsive to the components of magnetic flux perpendicular to the polar axis, means to measure the amplitude and phase of the voltage induced in the third coil and to display the values and direction thereof independently of*

*the values and direction displayed by the means for the second coil.*

References Cited in the file of this patent or the original patent

UNITED STATES PATENTS

| | | |
|---|---|---|
| 736,432 | Owens | Aug. 18, 1903 |
| 1,461,492 | Moody | July 10, 1923 |
| 1,787,992 | McIlvaine | Jan. 6, 1931 |
| 1,968,068 | Blancard | July 31, 1934 |
| 2,317,400 | Paulus | Apr. 27, 1943 |
| 2,339,291 | Paulus | Jan. 18, 1944 |
| 2,404,806 | Lindsay | July 30, 1946 |
| 2,428,360 | Dingley | Oct. 7, 1947 |
| 2,530,902 | O'Brien | Nov. 21, 1950 |
| 2,557,900 | Wallace | June 19, 1951 |
| 2,562,329 | O'Brien | July 31, 1951 |

FOREIGN PATENTS

| | | |
|---|---|---|
| 183,317 | Great Britain | July 27, 1922 |
| 198,090 | Great Britain | May 31, 1923 |
| 399,957 | Great Britain | Oct. 19, 1933 |